Patented Oct. 31, 1933

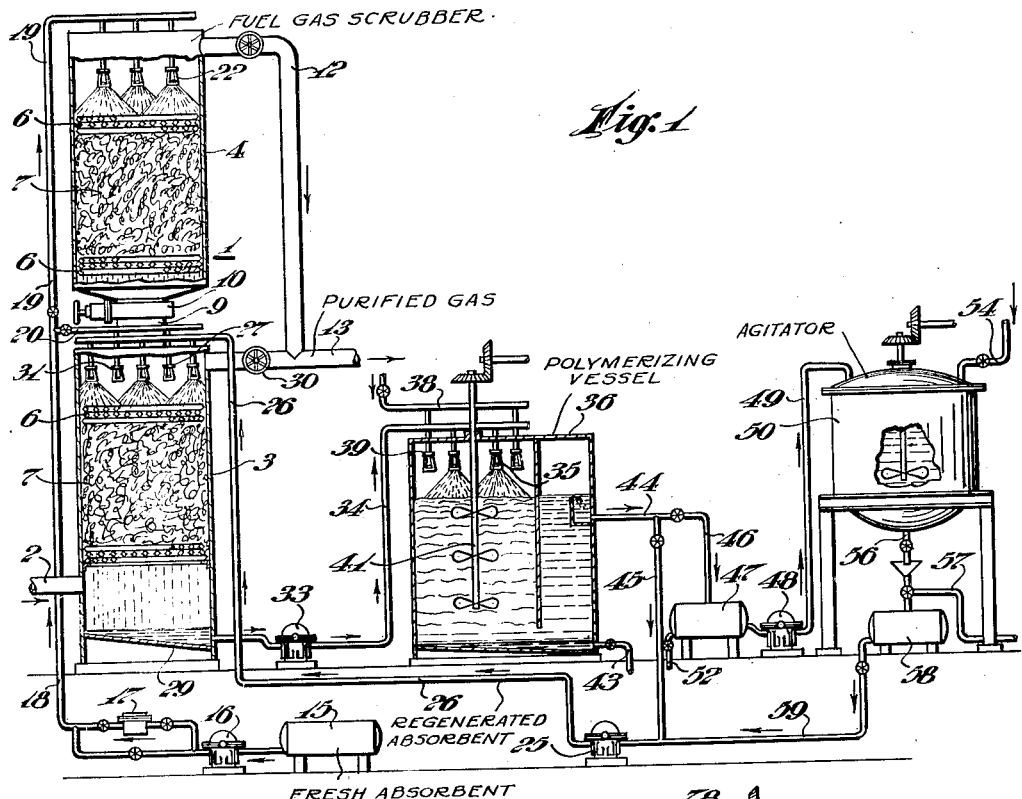
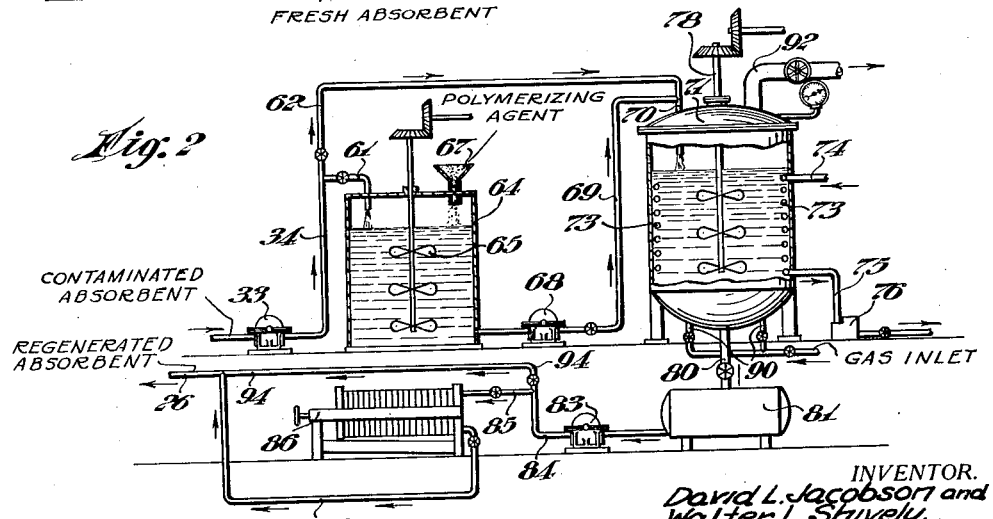

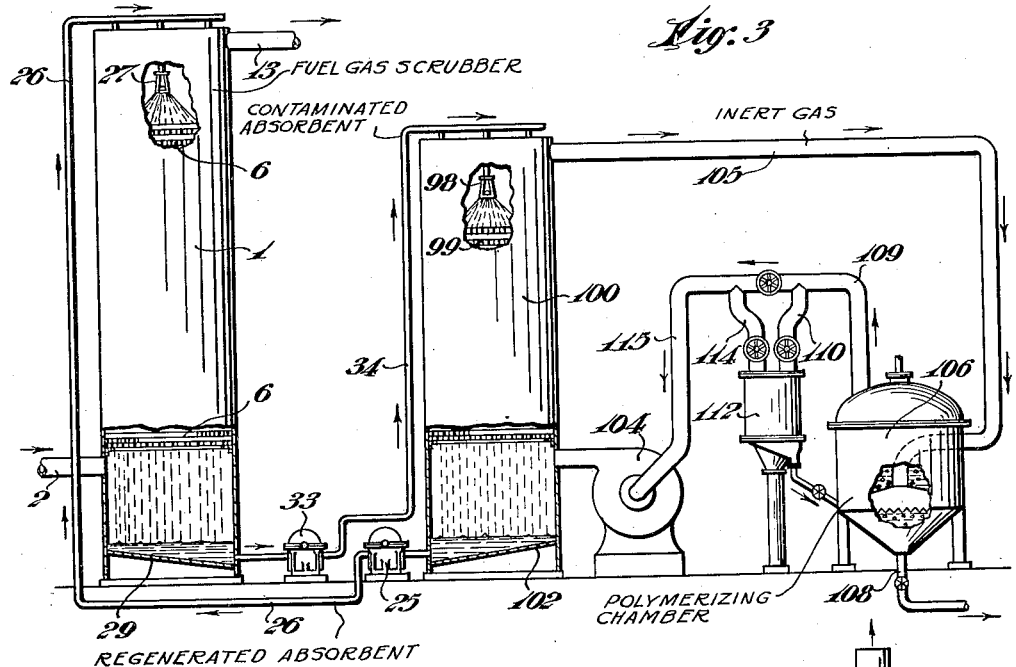
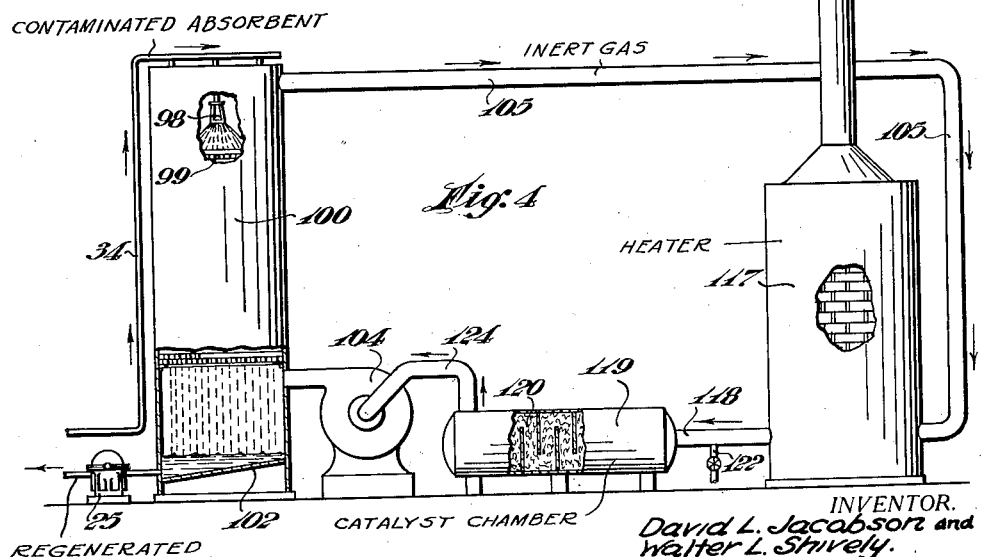

1,932,525

UNITED STATES PATENT OFFICE 1,932,525

TREATMENT OF FUEL GASES

David L. Jacobson, Pittsburgh, and Walter L. Shively, Wilkinsburg, Pa., assignors to The Koppers Company of Delaware, a corporation of Delaware Application September 19, 1930
Serial No. 482,990

8 Claims. (Cl. 183—114.6)

Our invention relates to the removal of indene, styrene and other gum-forming constituents from fuel gases such as coal gas, coke oven gas, carburetted water gas, etc.

The troublesome nature of gummy and resinous deposits in gas distributing systems is well known. These deposits are caused by various types of unsaturated organic compounds occurring in fuel gases, including certain benzenoid compounds such as indene, styrene, coumarone, etc., which are generally present in manufactured gas in the vapor state at temperatures far below their boiling points. The extent to which these gum-forming or resinifiable constituents are present in fuel gas, as sent out from the plant, is determined by several factors, including process and conditions of gas manufacture, temperature to which the gas is cooled prior to distribution, etc.

These compounds have characteristics which enable them to cause serious difficulties in the distribution of gases containing them, even when they are present in the gas to a very limited extent, as low as a few grains per 100 cu. ft.

Under certain conditions, as for example, when oil is condensed from the gas due to low temperatures encountered in the distributing system or due to the sudden expansion of compressed gas, these resinifiable compounds are removed from the gas and subsequently polymerized into sticky, gummy deposits. These deposits are cumulative and since they frequently occur at orifices in governors, thermostatic regulators and other appliances, they often lead to stoppages and other troubles.

Various methods of alleviating this troublesome condition have been devised in the past. For instance, the gum-forming constituents may be at least substantially removed by treatment with large quantities of fresh oil in a suitable scrubber. However, the application of such a process leads to the problem of disposing of the oil, which may in itself present serious difficulties at plants where no carburetted water gas is produced.

Furthermore, most of the processes heretofore devised for the removal of gum-forming constituents from gas also remove a considerable portion of the light oils. This is often undesirable, and, with the other disadvantages, makes these processes uneconomical in practice.

An object of our invention is to provide a process of removing gum-forming constituents from fuel gas prior to the distribution thereof.

A second object of our invention is to provide an economical process of removing gum-forming constituents from fuel gas substantially without removal of light oils therefrom.

According to our invention, gas containing gum-forming compounds is scrubbed with a suitable solvent which absorbs the indene, styrene, coumarone, etc., from the gas. The solvent is then treated with a polymerizing agent, such as concentrated sulphuric acid, sulphur chloride, or the like, to polymerize the absorbed compounds, and the treated solvent is recirculated to treat more gas. Polymerizing agents other than those mentioned may be used, as described hereinbelow, and we also provide other methods of reconditioning the recirculated solvent.

We prefer to use a heavy oil, such as wash oil or absorbent oil, for the solvent required in the practice of our invention. An especially suitable absorbent oil for this purpose is a petroleum fraction having a low olefine content and an initial boiling point of 475° to 500° F., or higher, such as an oil of the type described in the copending application of A. R. Powell, Serial No. 474,738, filed Aug. 12, 1930 (Case No. 373). This oil may be contacted with the gas in a special scrubber and then treated and recirculated, or oil from the recirculating section of a naphthalene scrubber of the type described in U. S. Patent No. 1,578,687 to F. W. Sperr, Jr., may be treated to polymerize the gum-forming constituents and then recirculated.

If it is found that direct treatment of the scrubbing oil with the polymerizing agent causes emulsions or is otherwise undesirable, an indirect method of treatment may be substituted. In that case, the oil from the fuel gas scrubber, containing the resinifiable material removed from the gas, is treated in a second scrubber with a gas which is preferably recirculated and which removes the indene, etc., from the oil. The oil is then recirculated over the fuel gas scrubber as before and the recirculated gas is passed through a bath of concentrated sulphuric acid or otherwise treated to polymerize the resinifiable matter before returning it to purify more oil.

Neither the direct nor the indirect treatment of the scrubbing oil allows removal of appreciable amounts of light oil from the fuel gas, but either treatment results in substantially complete elimination of the gum-forming constituents.

In addition to the objects set forth above, our invention has for further objects such operative advantages and results as may hereinafter be found to obtain.

With these and other objects in view, we now describe with reference to the accompanying drawings, a preferred method by which our invention may be practiced. In the drawings, Figure 1 is a more or less diagrammatic view, partly in elevation and partly in vertical section, of apparatus in which the process of our present invention can be practiced with direct treatment of the scrubbing oil with sulphuric acid before recirculation;

Fig. 2 is a similar view of a modified form of apparatus for direct treatment of the scrubbing oil;

Fig. 3 is a similar view of apparatus for scrubbing gum-forming constituents from the gas and indirectly polymerizing these constituents; and Fig. 4 is a similar view of a modified form of apparatus that may be substituted for part of the apparatus shown in Fig. 3.

Similar numerals designate similar parts of the apparatus in all of the drawings.

In Fig. 1, fuel gas containing undesirable gum-forming constituents is introduced into a scrubber 1 through a pipe 2. The scrubber may consist of a single section similar to the recirculating section 3 of the scrubber shown, or it may comprise a plurality of sections including a recirculating section 3 and fresh oil section 4, as shown in the present instance. Both sections are packed with suitable contact material such as wooden hurdles 6 and/or steel lathe turnings 7.

The gas entering the lower section 3 of the scrubber 1 passes upwardly through the contact material 6 and 7, and is brought into intimate contact with recirculated scrubbing oil which removes at least a substantial portion of the gum-forming constituents from the gas. The gas then continues through a passage 9 containing a valve 10 into the upper section 4 of the scrubber, where any remaining traces of gum-forming constituents and naphthalene are removed from the gas by fresh scrubbing oil which is supplied in quantity sufficient to remove these last traces and to make up for losses of oil in other parts of the system.

The gas freed from gum-forming constituents passes from the top of the scrubber 1 through a pipe 12 into a pipe 13 through which it is discharged to a storage holder (not shown) or otherwise disposed of as desired.

Fresh scrubbing oil is withdrawn from a tank 15 by a pump 16, and delivered through an automatic regulating meter 17 and a pipe 18 to the intersection of pipes 19 and 20. The oil continues through pipe 19 and is distributed by sprays 22 over the contact material 6 and 7 with which the upper section 4 of the scrubber 1 is packed. The oil after passing downwardly through the contact material in this section of the scrubber flows through the passage 9 and is mixed with the recirculated oil in the lower section 3 of the scrubber.

Recirculated oil after treatment to polymerize and/or remove gum-forming constituents is delivered by a pump 25 through a pipe 26 and sprays 27 onto the packing in the lower section 3 of the scrubber 1. Below the sprays 27, the recirculated oil is combined with the oil from the upper section 4 of the scrubber, and the combined oil flows down through the packing 6 and 7 and collects in a sump 29 near the bottom of the scrubber 1. With this method of operating the scrubber, the valve 30 is closed and the valve 10 is open.

If it is desired to use only a single recirculating section, the upper section 4 may be omitted, or the scrubber as shown may be used with the valve 10 closed, and valve 30 open. Fresh oil is then supplied as needed from pipe 18 through pipe 20 and sprays 31, or it may be added to the recirculating oil in some other manner. The gas passes directly out of the lower section 3 of the scrubber through the pipe 13.

Oil containing indene, styrene, and/or other gum-forming compounds, absorbed from the gas, collects in the sump 29 near the bottom of the scrubber in either case. This contaminated oil is withdrawn by a pump 33 and delivered through a pipe 34 and sprays 35 into the interior of an acid-treating chamber 36. Concentrated sulphuric acid is introduced into the chamber as needed through a pipe 38 and sprays 39, or other suitable means of delivery, such as mixing sprays, may be provided. This acid is preferably at a concentration of 66° Baumé, but acid of 64° Baumé or higher may be used.

The acid may be further mixed with the oil by a mixing propeller 41 as the liquids pass downwardly through the first section of the vessel 36. At least portions of the acid and of the polymerized gums or resins settle out in the bottom of the vessel 36, from which they are withdrawn through a pipe 43.

The oil substantially free from resinifiable material continues up through the second section of the treating vessel and is discharged through a pipe 44. This oil may now be recirculated through pipe 45 and pump 25 as described, or it may be desirable to treat the oil to remove excess acidity.

In the latter case, the oil continues from pipe 44 through a pipe 46 into a tank 47 from which it is withdrawn by a pump 48 and delivered through a pipe 49 into an agitator 50 or some other suitable neutralizing vessel. Acid or other material settling out in the tank 47 may be discharged through a pipe 52.

In the agitator 50, the acidified oil is stirred with a caustic soda solution or some other suitable alkali introduced into the agitator through a pipe 54. The neutralized oil is then allowed to stand. Sludge and salts separate from the oil and are withdrawn through a pipe 56 and discharged through a pipe 57.

The purified oil is then withdrawn through the pipe 56 into the tank 58 from which it is recirculated through the pipe 59, the pump 25 and the pipe 26 to the sprays 27 in the scrubber, as described hereinabove. When other liquid polymerizing agents are substituted for the sulphuric acid, the neutralizing treatment may not be necessary.

It is generally preferable to have the treating chamber 36, tank 47 or 58, or agitator 50, in which treated oil stands prior to recirculation, of sufficient size to permit storage of enough of the oil undergoing treatment to allow for the time lag which sometimes occurs in regeneration.

If it is desired to use a non-liquid polymerizing agent, apparatus such as that shown in Fig. 2 may be employed. Oil contaminated with gum-forming constituents removed from the gas is delivered by a pump 33 through a pipe 34 to the intersection of pipes 61 and 62. If, for instance, a polymerizing agent such as aluminum chloride is to be used, the oil flows through pipe 61 into a treating vessel 64.

In this vessel 64, the oil is mixed by a suitable stirring device such as a propeller-type mixer 65 with the polymerizing agent (in this case aluminum chloride) which is introduced into the vessel 64 from a hopper 67. The oil mixture is withdrawn from the vessel 64 by a pump 68 and delivered through pipes 69 and 70 into a pressure vessel 71.

In this vessel 71, the mixture is kept at the desired temperature and pressure by steam introduced into coils 73 through a pipe 74, or by other suitable heating means. The condensed steam is discharged from the coils through a pipe 75 and steam trap 76. The mixture in the pressure vessel may be stirred if desired by a mixer 78.

When the treatment under pressure has been continued as long as is desired, the oil containing the polymerized material is discharged through a pipe 80 into a tank 81. From this tank, the mixture is withdrawn by a pump 83 and delivered through pipes 84 and 85 to a filter press 86 or other suitable means of separation. The clarified and reconditioned oil is discharged from the filter 86 through a pipe 87 to pipe 26 through which it is returned to the scrubber to treat further quantities of gas.

Another means of reconditioning scrubber oil contaminated with gum-forming constituents removed from the fuel gas is by hydrogenation. This may be accomplished by delivering the contaminated oil through pipes 34 and 61 into the mixing vessel 64 in which the oil is mixed with a hydrogenation catalyst introduced from the hopper 67. The mixture is then transferred to the pressure vessel 71 as before and in this vessel it is treated with hydrogen introduced under pressure through pipes 90. Some other suitable type of hydrogenating apparatus may be substituted for the vessel 71 if desired.

After hydrogenation of the resinifiable compounds has been completed, the pressure in the vessel is released. Excess hydrogen can be discharged through a pipe 92 to a storage holder (not shown) or otherwise disposed of, and the mixture of oil and hydrogenated material is discharged through the pipe 80 into the tank 81. It is then filtered, and the reconditioned oil is returned to the scrubber through pipes 87 and 26 as before.

In another modification of our process, conversion of the resin-forming constituents is accomplished by means of oxygen. In this case, the enriched (or contaminated) oil is delivered by the pump 33 through pipes 34, 62 and 70 into the pressure vessel 71. Oxygen is introduced through the pipes 90 and the vessel is maintained at the desired temperature and pressure until oxidation of the gum-forming compounds is completed. The oil is then discharged through the pipe 80 to the tank 81 and if filtration is not necessary, it may be delivered through pipes 84 and 94 to pipe 26, thence to the scrubber as before.

When direct treatment of the recirculated scrubber oil to polymerize or otherwise convert the resinifiable constituents removed from the gas into relatively harmless compounds of higher molecular and lower vapor pressure causes emulsions or is otherwise undesirable, as sometimes happens, apparatus such as that shown in Fig. 3 may be employed. In this case, scrubber oil contacted with the gas in the scrubber 1, which may consist of one or more sections, collects in the sump 29 at the bottom of the scrubber and is withdrawn by the pump 33 and delivered through the pipe 34 and sprays 98 or other suitable distributing devices onto the packing material, such as wooden hurdles 99, in another scrubber 100.

In this scrubber, the oil is treated with recirculated gas which removes gum-forming compounds from the oil. The oil after passing downwardly through the contact material 99 and being freed of its gum-forming constituents collects in a sump 102 near the bottom of the scrubber 100.

From the sump 102, the reconditioned oil is withdrawn by a pump 25 and delivered through a pipe 26 and sprays 27 back into the fuel gas scrubber 1. Gas for reconditioning the oil in the scrubber 100 is recirculated by a blower 104 or other suitable means upwardly through the scrubber 100, from which it passes through a pipe 105 containing gum-forming constituents removed from the oil.

The recirculated gas then enters a bubbling chamber 106, or other suitable contact device, by means of which the gas is contacted with an agent such as sulphuric acid which polymerizes and/or removes the gum-forming constituents. Any sludge forming in the vessel 106 can be withdrawn through a pipe 108. The gas at least substantially free from gum-forming constituents continues through pipes 109 and 110 into an acid separator 112, then through pipes 114 and 115 to the blower 104, by which it is recirculated as described. In some instances, the acid separator 112 can be omitted and the gas then passes directly from pipe 109 into pipe 115.

Other means of polymerizing the gum-forming constituents removed from the oil in the scrubber 100 may be employed. For instance, as shown in Fig. 4, the recirculating gas enriched with gum-forming constituents in the secondary scrubber 100 may pass through pipe 105 to a suitable heating device, such as a regenerative heat exchanger 117, in which its temperature is raised to the desired point for catalytic hydrogenation, oxidation, or pyrogeneous polymerization by other means.

The heated gas then passes through a pipe 118 into a catalytic chamber 119. The recirculated gas may contain sufficient quantities of oxygen, hydrogen, etc., for conversion of the resin-forming constituents on contact with the catalytic material 120 in the chamber 119, or sufficient quantities of the gas or gases required for polymerization or other conversion of the gums may be introduced through a pipe 122 into the pipe 118 and thus carried into the catalytic chamber with the recirculated gas.

After catalytic polymerization of the resin-forming constituents, the gas returns through a pipe 124 to the blower 104 by which it is recirculated through the scrubber 100 and the rest of the system. The reconditioned oil collects in the sump 102 as before and is returned by the pump 25 to the fuel gas scrubber.

In some instances it may be desirable to cool the reconditioned oil before returning it to the scrubber 1. This may be at least partially accomplished by passing the oil through an oil-to-oil heat exchanger in which heat is transferred to the oil entering the scrubber 100 through pipe 34.

Whether the direct or indirect method of reconditioning the scrubbing oil is used, substantially no light oils are removed therefrom. The light oil content of the scrubbing oil therefore comes to equilibrium with the light oils in the fuel gas treated, so that undesirable stripping of light oils from the gas is avoided.

The process hereinabove described serves to reduce the vapor pressure of the gum-forming benzenoid constituents absorbed in the scrubbing oil to such a point that satisfactorily complete removal of these constituents from further quantities of gas is effected when the oil is recirculated over the scrubber. This result is common to all the described modifications of the process, whether the agency by means of which the result is obtained is a gas, a liquid, a solid, or a combination thereof.

It will be obvious to those skilled in the art that various modifications may be made in the several steps of our process and in the several parts of our apparatus in addition to those mentioned hereinabove without departing from the spirit of our invention, and the claims are intended to cover such modifications as can reasonably be included within the scope thereof.

We claim as our invention:

1. The process of treating fuel gas containing gum-forming constituents which comprises recirculating solvent over a stage in which it absorbs gum-forming compounds from the said fuel gas and over a stage in which it is treated with recirculated gas containing oxygen and hydrogen to reduce the vapor pressure of the absorbed gum-forming compounds by at least partial removal thereof from the solvent, and passing the said recirculated gas through another stage in which the partial pressure of gum-forming constituents contained therein is reduced.

2. The process of treating fuel gas containing benzenoid constituents which comprises recirculating solvent over a stage in which it absorbs gum-forming compounds from the said fuel gas and over a stage in which it is treated with recirculated gas to reduce the vapor pressure of the absorbed gum-forming compounds by at least partial removal thereof from the solvent, and passing the said recirculated gas through another stage in which the partial pressure of gum-forming constituents contained therein is reduced.

3. The process of treating fuel gas containing gum-forming constituents which comprises contacting the gas with a solvent which absorbs gum-forming compounds therefrom, mixing the thereby enriched solvent with hydrogen and a catalyst for hydrogenation, holding the resulting mixture at a temperature and pressure substantially above atmospheric for a period sufficient for hydrogenation of substantially all gum-forming compounds contained in the solvent, removing solids from the treated solvent by filtration, and recirculating the reconditioned solvent to absorb gum-forming constituents from further quantities of fuel gas.

4. The process of treating fuel gas containing gum-forming constituents which comprises contacting the gas with a solvent which absorbs gum-forming compounds therefrom, treating the thereby enriched solvent with oxygen under conditions of pressure and temperature which promote polymerization of gum-forming compounds contained in the solvent by oxygenation, and recirculating the solvent to treat further quantities of fuel gas.

5. The process of treating fuel gas containing gum-forming constituents, which comprises contacting the fuel gas with a solvent which adsorbs gum-forming compounds therefrom and is thereby enriched, recirculating gas through a stage in which it removes gum-forming compounds from the said enriched solvent and a stage in which the thereby removed gum-forming compounds are polymerized, and recirculating the solvent to treat further quantities of fuel gas.

6. The process of treating fuel gas, which comprises contacting the gas with a solvent which absorbs gum-forming compounds therefrom, treating the thereby enriched solvent with a hydrogen-containing gas to reduce the vapor pressure of the gum-forming compounds contained therein, and recirculating the solvent to treat more fuel gas.

7. The process of treating fuel gas, which comprises contacting the gas with a solvent which absorbs gum-forming compounds therefrom, treating the thereby enriched solvent with hydrogen-oxygen-containing gas to reduce the vapor pressure of the gum-forming compounds contained therein, and recirculating the solvent to treat more fuel gas.

8. The process of treating fuel gas, which comprises contacting the gas with a solvent which absorbs gum-forming compounds therefrom, treating the thereby enriched solvent with an oxygen-containing gas to reduce the vapor pressure of the gum-forming compounds contained therein, and recirculating the solvent to treat more fuel gas.

DAVID L. JACOBSON.
WALTER L. SHIVELY.